United States Patent Office 3,214,159
Patented Oct. 26, 1965

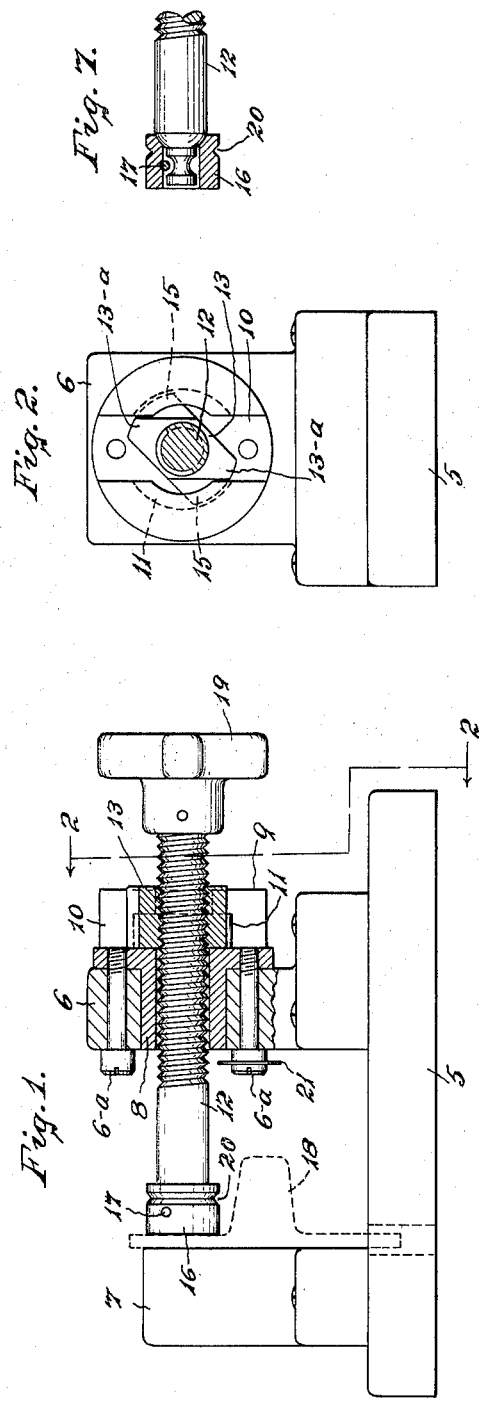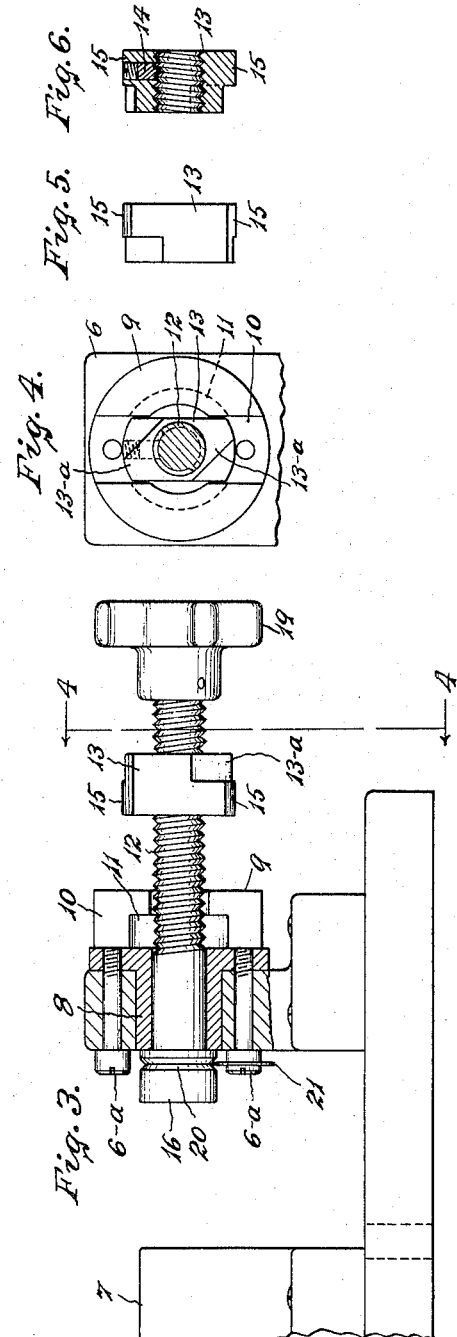

3,214,159
RAPID CLAMP
Le Roy Hart, Southington, Conn.
(70 Park St., Plainville, Conn.)
Filed Dec. 16, 1963, Ser. No. 330,668
6 Claims. (Cl. 269—189)

This invention relates to a Rapid Clamp and, more particularly, to a device for clamping a work piece in a desired position, or unclamping said work piece, with minimum rotation of a clamping screw in said device.

An object of this invention is to provide a clamping device having a clamping screw which can be rapidly moved to, or from, different clamping positions and which has an uninterrupted thread for forcing said screw into, or out of, clamping engagement with a work piece.

A further object is the provision of a clamping device having a clamping screw which is slideably movable to or from clamping positions and forcible into, or out of, clamping engagements by means of an uninterrupted thread.

Further objects and advantages of this invention will be clearly understood from the following description and the accompanying drawings in which:

FIG. 1 is a side view, partly in central vertical section, showing, in clamping position, one form of a rapid clamping device embodying the present invention.

FIG. 2 is an end view of said clamping device on line 2—2 of FIG. 1.

FIG. 3 is a view similar to FIG. 1 but showing said device in its normal, or open, position.

FIG. 4 is a sectional end view on line 4—4 of FIG. 3.

FIG. 5 is a side view of the screw locking nut used in said device.

FIG. 6 is a side view of said nut in central vertical section.

The embodiment of my invention shown in the drawings includes a base 5 on which is mounted a housing, preferably in the form of a wall 6, and an opposed clamping jaw 7.

A bushing 8 is mounted on the wall 6 and is secured thereto by screws 6-A. Said bushing has a head 9 with a cross slot 10 therein and an annular locking groove 11 which connects with said cross slot through the opposite sides thereof.

A clamping screw 12 is axially slideable through said bushing 8 and has a locking nut 13 threaded thereto. Said locking nut has a nylon plug 14 which engages the screw 12 to frictionally prevent the lock nut from rotating too freely on said screw.

The said locking nut 13 is rotatable in the slot 10 and has locking ears 15—15 which enter the annular locking groove 11, when said nut 13 is rotated within the slot 10, and lock said nut against axial movement in the housing wall 6.

The screw 12 is axially slideable in the bushing 8 and has a work engaging tip 16 which is swivelly mounted on its inner end and rotatably secured thereto by a locking pin 17 as clearly illustrated in FIG. 7. The said tip is preferably provided with an annular groove 20 which is engaged by a suitable yieldable retainer 21 to retain the clamping screw in its normal position in the housing 6, as shown in FIG. 3.

In the use of improved rapid clamping device, the work piece 18 is placed against the clamping jaw 7, as indicated in dotted lines in FIG. 1, or any other suitable clamping surface, and rapidly clamped in position by merely sliding the screw 12 in the bushing 8 until the locking nut 13 enters the slot 10 and then rotating said screw by the handle 19; whereupon initial rotation of said screw will rotate said locking nut until its ears 15—15 enter the annular groove 11, as shown in FIG. 2, and a slight further rotation of said screw will force the clamping tip 16 against the work piece and thereby firmly clamp said work piece in position.

When the work piece is to be unclamped, the screw 12 is rotated in the opposite direction; whereupon initial rotation thereof will release the pressure on said work piece and locking nut 13 and a slight further rotation will rotate the locking nut with said screw, to disengage the ears 15—15 from the annular groove 11, and thereby permit said screw to be rapidly slid back to its normal position shown in FIG. 3.

It will be noted that, after the ears 15—15 have entered the annular groove 11, further rotation of the locking nut is prevented by engagement of the abutment portions 13-A with the sides of the cross slot 10. When said nut is rotated to unlocking position, further rotation thereof is prevented by engagement of its sides with the sides of the cross slot.

A particular advantage of my improved rapid clamp over prior devices of its class, such as those using an uninterrupted thread on the clamping screw, is provided by the full thread of the screw 12 which is in constant engagement with the thread of the locking nut 13 and thereby permits full rotations of the clamping screw without becoming disengaged from the locking nut.

I claim:

1. A rapid clamping device including a base, a housing on said base, a clamping surface opposed to said housing, a clamping screw axially slideable in an opening extending through said housing, a locking nut threaded to said screw and slideable therewith in said housing, said housing having an annular groove co-axial with said screw, and locking ears on said nut engageable with said groove upon initial rotation of said screw for securing said nut to said housing; whereby further rotation of said screw will move same axially in said housing for clamping a work piece against said clamping surface.

2. A rapid clamping device including a base having a housing thereon, a bushing extending through said housing, a clamping screw slideable in said bushing, a locking nut threaded to said screw with a continuous thread and rotatable therewith, an annular locking groove in said bushing co-axial with said screw, and locking ears on said nut engageable with said groove upon initial rotation of said screw; whereby further rotation of said screw will move same axially relatively to said housing for clamping a work piece against a clamping surface opposed to said housing.

3. A rapid clamping device including a base having a housing extending therefrom, a bushing extending through said housing, said bushing having a head portion disposed against said housing and secured thereto, a clamping screw axially slideable in said bushing and having a locking nut threaded thereto, said head portion having a cross slot therein to receive said nut and an annular locking groove co-axial with said screw and communicating with said slot through the opposite sides thereof, and locking ears on said nut engageable with said annular groove; said nut being slideable and frictionally rotatable with said screw whereby when said screw is slid in said housing towards clamping position said nut will enter said slot and initial rotation of said screw will rotate said nut and cause said ears to enter said annular groove and thereby lock said screw to said housing; whereby further rotation of said screw will move same axially in said housing and clamp a work piece between said screw and a clamping surface opposed to said housing.

4. A rapid clamping device as set forth in claim 3 including friction means between said nut and screw for causing rotation of said nut with the screw.

5. A rapid clamping device as set forth in claim 3 including stop means on said luck nut engageable with the sides of said slot for retaining said locking ears in engagement with the annular groove during rotation of the screw towards clamping position, and separate stop means on said nut also engageable with the sides of said slot for retaining the locking nut out of engagement with said groove during rotation of the screw towards unclamping position.

6. A rapid clamping device including a housing, a clamping screw axially slideable in said housing, a locking nut threaded to said screw with a continuous thread and slideable therewith relatively to said housing, said screw being fully rotatable in said nut, and locking means on said housing engageable by said locking nut for securing said locking nut to said housing against rotation and axial movement to cause axial movement of said screw upon rotation thereof.

References Cited by the Examiner
UNITED STATES PATENTS

| | | | |
|---|---|---|---|
| 226,841 | 4/80 | Fisher | 269—185 |
| 2,430,458 | 11/47 | Farrell | 269—182 X |
| 3,137,336 | 6/64 | Wing | 151—69 X |

ROBERT C. RIORDON, *Primary Examiner.*

FRANK SUSKO, *Examiner.*

UNITED STATES PATENT OFFICE
CERTIFICATE OF CORRECTION

Patent No. 3,214,159                        October 26, 1965

Le Roy Hart

It is hereby certified that error appears in the above numbered patent requiring correction and that the said Letters Patent should read as corrected below.

Column 1, line 64, after "of" insert -- my --; column 2, lines 20 and 21, for "uninterrupted" read -- interrupted --; line 72, for "luck" read -- lock --.

Signed and sealed this 28th day of June 1966.

(SEAL)
Attest:

ERNEST W. SWIDER                        EDWARD J. BRENNER
Attesting Officer                          Commissioner of Patents